United States Patent Office 3,117,584
Patented Jan. 14, 1964

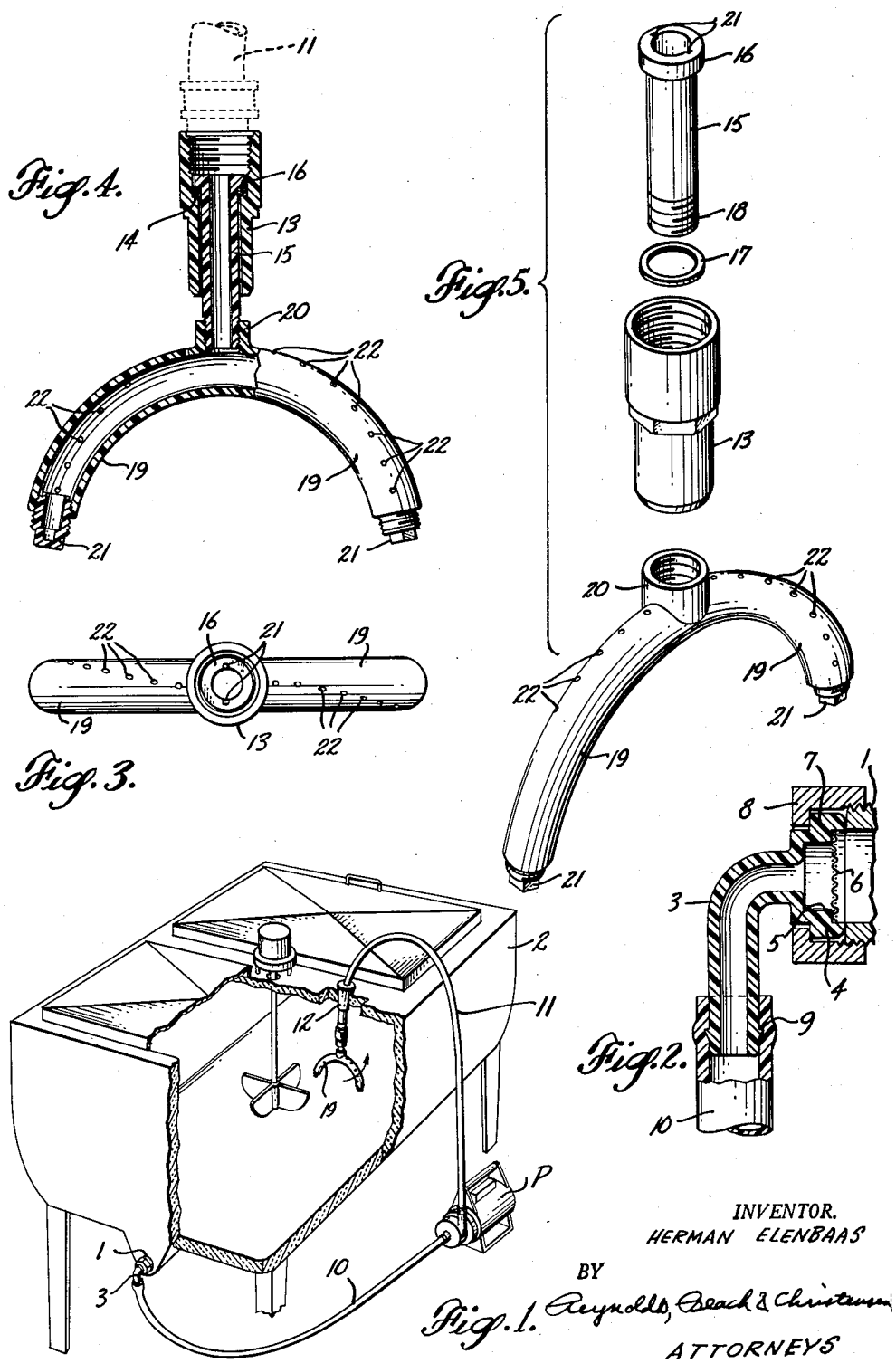

3,117,584
SANITARY TANK SPRAY WASHER ATTACHMENT
Herman Elenbaas, P.O. Box 273, Lynden, Wash.
Filed May 2, 1960, Ser. No. 26,080
4 Claims. (Cl. 134—168)

This invention relates to a washer attachment of the spray type which is sanitary and consequently is particularly useful for such purposes as cleansing farm milk-holding tanks.

Recently the use of tanks on farms to hold fresh milk has become increasingly popular but because milk spoils rather readily it is important to clean the tank thoroughly after it is emptied so that there will be no residue of milk in the tank which will spoil and contaminate the next batch of milk stored in the tank. Customarily, a disinfectant solution is used for washing such milk-holding tanks but this disinfectant solution has been applied to the tank interior by placing disinfectant solution in the tank and then brushing the surfaces of the tank with such solution by hand. If great care is not taken, a thorough cleaning operation will not be accomplished.

It is the principal object of the present invention to provide an effective spray washer attachment for milk-holding tanks which will discharge a spray reaching all the surfaces within such a milk-holding tank but which, at the same time, will recirculate the disinfectant liquid so that a minimum of such liquid will be used. In such recirculating action it is an object to secure the attachment to the usual tank drain fitting so that disinfectant liquid discharged from the spray head into the interior of the tank can be withdrawn from such drain fitting by a suitable pump to be sprayed again into the tank.

A particular object of the present invention is to provide such apparatus which is made of noncorrodible material so that it cannot contaminate the tank and preferably such material is plastic of a type which is unaffected by the disinfectant solution.

It is also an object of the present invention to provide such a spray washing attachment for milk-holding tank drains which will be of simple and economical construction, which can be attached to and installed in a milk tank quickly and easily and which can easily be disconnected and removed from the milk tank.

While such spray washing apparatus is effective in operation it can be made of plastic material quite economically and will be durable and not easily damaged or broken so that minimum expense and trouble is required to maintain it in operating condition.

The attachment includes a fitting adapted to be connected to the tank drain and this fitting is connected by a hose, preferably of plastic material, to a suitable pump which may be of the type disclosed in my copending patent application Serial No. 26,038, filed May 2, 1960, for Sanitary Centrifugal Pump. The discharge opening of this pump is connected by a suitable hose to the spray washing head which is suspended within the milk tank in an effective position for cleaning the tank. The spray head is rotative and driven by the reaction of liquid sprayed from it. Such spray head includes a plurality of curved horns, two being sufficient, the convex sides of which have perforations disposed in a spiral arrangement from which liquid is projected for the dual function of cleansing the interior of the tank and effecting rotation of the spray head to distribute the spray around the tank interior.

FIGURE 1 is a top perspective view of a farm milk-holding tank with portions of its wall broken away to show the tank spray washer attachment installed.

FIGURE 2 is a side elevation view of a fitting for connecting the attachment to the drain outlet of the tank with parts broken away to show the internal structure of the fitting.

FIGURE 3 is a plan view of the spray head and FIGURE 4 is a side elevation view of the spray head with parts broken away to show its internal construction. FIGURE 5 is an exploded view of parts of the spray head.

In providing a spray washer attachment for milk tanks, four principal requirements must be considered. The first requirement is that the disinfectant liquid be sprayed forcefully on every portion of the tank interior so as to accomplish a thorough cleansing job. The second requirement is that the cleansing apparatus be made of noncorrodible material and material which will not be affected by the disinfectant liquid so as to avoid all possibility of milk subsequently placed in the tank being contaminated by material from the washing apparatus. The third requirement is that the washing apparatus be economical and convenient to operate, namely, that its use require a minimum of washing liquid and that its operation require a minimum of attention and manipulation on the part of the operator. The fourth requirement is that the apparatus be economical to make and this requirement is accomplished by making the apparatus of molded plastic material, of simple design, and with a minimum of parts.

The washing apparatus includes three principal components which are connected by hoses. The first component is the fitting for attaching the washing apparatus to the drain 1 of a conventional container to be cleansed such as the milk-holding tank 2. The connecting fitting for the spray washer, shown best in FIGURE 2, includes the elbow 3 having on one end an enlarged head 4, the end of which can be disposed in abutment with the end of the outlet 1 as shown in FIGURE 2. This head has an internal shoulder 5 facing the end of the fitting on which a screen 6 can seat to catch particles which otherwise might flow into the pump and washing apparatus, without detracting from the delivery force of the pump. The exterior of this head has a reduced portion forming a shoulder 7 facing away from the end of the fitting adapted to abut the tank outlet. A nut collar 8 may be fitted over this reduced portion of the head to bear against the shoulder 7 and extend around the larger portion of the head for attachment to the threaded exterior of the drain pipe 1. As the nut is rotated, of course, its shoulder-engaging flange will press on such shoulder 7 to hold the end of the fitting head tightly against the end of the drain duct 1. The opposite end of the elbow 3 has an annular rib 9 which will assist in retaining the end of hose 10 on the end portion of the elbow.

The hose 10 connects the attaching fitting of the apparatus to a pump P which may be of the centrifugal type. This pump will produce a suction force on hose 10 and propel disinfectant washing liquid through the hose 11 connecting the discharge port of the pump to the spray head of the washer. Such pump can be of any suitable type and capacity but the sanitary pump disclosed in my copending patent application Serial No. 26,038, filed May 2, 1960, for Sanitary Centrifugal Pump discloses a preferred type of pump for this use.

It is preferred that the spray head be of the suspended type and hang down into the tank rather than being of the stand type resting on the bottom of the tank because in that case it would be necessary for the spray head support to stand in disinfectant liquid in the bottom of the tank if the tank is generally level. In order to project jets of water against every part of the tank interior while using a minimum quantity of disinfectant liquid it is necessary that the spray head be of the rotary type. While such spray head might have a number of spray arms or horns greater than two, it has been found that two such arms or horns on a whirling head are sufficient to do a thorough cleansing job if the jets are directed in the proper direction.

To suspend the spray head within the tank to be washed the hose 11 is clamped in place in an aperture provided in the top of the tank. Such clamping action is accomplished by inserting the hose 11 through the bore of an externally tapered bushing 12 of resilient material such as plastic or rubber which is of a size externally to fit snugly and be wedged into the hole in the top of the tank. As the bushing is pressed tightly into the hole it will be contracted somewhat to embrace the hose 11 tightly and prevent the hose from thereafter slipping downwardly through the bushing and aperture.

On the end of the tube 11 thus suspended in the aperture in the top of the tank 2 is mounted a sleeve 13 such as by interengaged internal and external threads. This sleeve has in it a shoulder 14 facing the threaded end of the sleeve, and the portion of the sleeve at the side of such shoulder remote from the supported end of the sleeve has a bore of reduced diameter extending through it. In this bore a rotatable tube 15 of a length greater than the length of the reduced bore in the sleeve 13 is received loosely.

This tube has an external flange 16 projecting from one end which is small enough to be received in the larger portion of the bore of sleeve 13 but is too large to pass through the reduced bore of such sleeve. Between the shoulder 14 of sleeve 13 and the flange 16 of tube 15, one or more thrust bearing washers 17 are interposed, as shown in FIGURES 4 and 5, to facilitate rotation of the tube in the sleeve. Two such washers are shown in FIGURE 4 and they are preferably made of Teflon plastic material which produces very little friction between relatively rotatable parts. On the projecting end of tube 15 is the external thread 18.

The tube 15 constitutes a rotative support for the spray head which, in FIGURE 4 is shown as a substantially semitoroidal tube supported substantially midway between its ends with its concave side downward and its convex side upward. Such spray head has two identical horns 19 curving relative to and diverging away from an internally threaded mounting boss 20 projecting from the central portion of the convex side of the spray head, so as to be generally inclined relative to the tube 15. The threads of this boss are complemental to and can be screwed on the threads 18 of the tube 15. In order to facilitate the attachment of these parts, notches 21 can be provided in the end of tube 15 opposite its threaded end 18 into which a screwdriver, a suitable wrench, or other tool can be fitted to grip the tube 15 easily while such tube and the spray head are being rotated relatively to screw the head onto the tube.

The arcuate horns 19 of the spray head should each have an arcuate extent of approximately 90°. The end of each horn remote from the mounting boss 20 is closed by a plug 21 threaded into the end of the horn. To enable liquid to escape from the horns, therefore, each horn is perforated by holes extending in a substantially spiral row from the convex side of each horn adjacent to the mounting boss 20 substantially to a planar side of the horn adjacent to its end. In the spray head shown in the drawing, there are seven apertures 22 in each horn arranged in this pattern but there may be more or fewer apertures if desired. Moreover, the apertures may be of different size but they should be of a size which will project the disinfectant liquid from them with considerable force onto the walls within the tank 2.

The upwardly directed holes adjacent to the spray head mounting boss 20 will wash the inside of the tank top. The jets projected from adjacent apertures will diverge as well as each spray diverging so that as the spray head whirls by rotation of the tube 15 in sleeve 13 the jets will cover the entire interior of the tank. At the central portion of each arm the holes on the convex sides of the horns as shown in FIGURE 5 will project jets almost directly in to the upper corners of the tank to flow down the tank walls. The apertures farther toward the tips of the horns would, of course, project jets which would strike the sides of the tank more directly if such apertures were in the convex sides of the horns. By placing such apertures only on the trailing planar side of each arcuate horn, however, or between such planar side and its convex side, each jet produces a reaction at an angle to the central plane of the horn which produces a component tending to rotate the horn. The composite effect of such force components on the plurality of horns is to cause the spray head to rotate as indicated by the arrow in FIGURE 1. Such auto-rotation of the spray head effected by the jets projected from the apertures in the horns of the spray head is a very convenient expedient for rotating the spray head.

After a milk-holding tank has been drained through its outlet 1, the nut 8 can be screwed onto the outlet to secure the tank discharge fitting of the spray washer attachment to the tank outlet. A rather small amount of disinfecting liquid can then be placed in the tank and the end of hose 11 can be inserted through the hole in the top of the tank until the bushing 12 enters such hole, and it is then pressed into place so as to fix the tube end in the hole. The sleeve 13 of the spray head is then screwed onto the end of hose 11 to mount the spray head in the manner illustrated in FIGURE 1. It is then only necessary to energize the motor to drive pump P whereupon the disinfecting liquid will be withdrawn from the tank through the hose 10 and forced through the hose 11 into the spray head with enough force to whirl it and project the liquid disinfectant solution from the spray head onto the interior of the tank's top and walls to wash the milk from them until it has been absorbed in the disinfecting solution. When such solution has been recirculated through the spray head sufficiently to cleanse the tank, the pump is stopped, the nut 8 is unscrewed from the drain pipe 1 to disconnect the washer attachment, and the used disinfectant liquid can then be withdrawn from the tank and discarded.

I claim as my invention:

1. In a tank spray washer, a spray head adapted to be supported within the tank suspended from the top thereof, said spray head comprising a supporting member, a tubular member depending from and supported by said supporting member and rotatable relative thereto, and a plurality of hollow horns carried by said tubular member in positions diverging downwardly away from said tubular member, each of said horns having perforations through its wall including a perforation directed upwardly for ejecting a jet against the underside of the tank top, a perforation in one side only of the horn directed generally horizontally and transversely of a vertical plane generally parallel to the horn for ejecting a jet producing a reaction to rotate said spray head and a perforation in the upper side of a downwardly inclined portion of the horn for ejecting a jet upward and away from said supporting member against the upper portions of the tank sides as the spray head is rotated.

2. In a tank spray washer, a spray head adapted to be supported within the tank suspended from the top thereof, said spray head comprising a supporting sleeve, a tubular member depending from and supported by said sleeve and rotatable relative thereto, and two hollow horns disposed parallel to the same vertical plane, carried by and diverging downwardly away from said tubular member, each of said horns having a row of perforations through its wall including a perforation near the upper end of the horn directed upwardly for ejecting a jet against the underside of the tank top, a perforation near the lower end of the horn in one side only and directed generally horizontally and transversely of such vertical plane for ejecting a jet producing a reaction to rotate said spray head and a perforation in the upper side of a downwardly inclined portion of the horn for ejecting a jet upward and away from said supporting sleeve against the upper portions of the tank sides as the spray head is rotated.

3. In a tank spray washer, a spray head adapted to be supported within the tank, said spray head comprising a supporting tube, a tubular member supported by said supporting tube and rotatable relative thereto, and a substantially semitoroidal tube having the central portion of its convex side mounted on said tubular member to dispose the two arcuate horns at opposite sides of the tubular member curving downwardly away from said tubular member, each of said horns being of plastic material and having a row of perforations through its wall extending spirally around the horn and including a perforation near the upper end of the horn directed upwardly for ejecting a jet against the underside of the tank top, a perforation near the lower end of the horn in one side only and directed substantially perpendicular to a vertical plane generally parallel to the horn for ejecting a jet producing a reaction to rotate said spray head and a perforation in the upper side of a downwardly inclined portion of the horn for ejecting a jet upward and away from said supporting tube against the upper portions of the tank sides as the spray head is rotated.

4. In a tank spray washer, a rotary spray head, and a member adapted to support said rotary spray head within the tank, said spray head comprising a tubular member supported by said supporting member and rotatable relative thereto, and a plurality of hollow horns carried by said tubular member in positions diverging downwardly away from said tubular member, each of said horns having perforations through its wall including a perforation directed upwardly for ejecting a jet against the underside of the tank top, a perforation directed generally horizontally and transversely of a vertical plane generally parallel to the portion of the horn adjacent to said tubular member for ejecting a jet producing a reaction to rotate said spray head and a perforation in the upper side of a downwardly inclined portion of the horn for ejecting a jet upward and away from said supporting member against the upper portions of the tank sides as the spray head is rotated.

References Cited in the file of this patent

UNITED STATES PATENTS

| | | |
|---|---|---|
| 273,940 | Bonninghausen | Mar. 13, 1883 |
| 314,326 | Galloway | Mar. 24, 1885 |
| 458,014 | Caswell | Aug. 18, 1891 |
| 690,762 | Papenfus | Jan. 7, 1902 |
| 1,526,991 | Lambert | Feb. 17, 1925 |
| 1,901,683 | Weidman | Mar. 14, 1933 |
| 2,015,923 | Davis | Oct. 1, 1935 |
| 2,314,357 | Lehman | Mar. 23, 1943 |
| 2,495,900 | Laws | Jan. 31, 1950 |
| 2,808,842 | Pollock | Oct. 8, 1957 |
| 2,835,529 | Egly et al. | May 20, 1958 |
| 2,895,688 | Seiberling et al. | July 21, 1959 |
| 2,904,809 | Clayson | Sept. 22, 1959 |
| 2,933,093 | Handyside | Apr. 19, 1960 |
| 2,992,781 | Howard | July 18, 1961 |

FOREIGN PATENTS

| | | |
|---|---|---|
| 217,057 | Australia | Feb. 28, 1957 |
| 359,000 | Germany | Sept. 19, 1922 |